(12) United States Patent
Bae et al.

(10) Patent No.: US 10,116,562 B2
(45) Date of Patent: Oct. 30, 2018

(54) COMMUNICATION INTERFACE APPARATUS

(71) Applicant: LSIS CO., LTD., Gyeonggi-do (KR)

(72) Inventors: Gyu-Sung Bae, Gyeonggi-do (KR); Woo-Hyun Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 184 days.

(21) Appl. No.: 15/254,274

(22) Filed: Sep. 1, 2016

(65) Prior Publication Data

US 2017/0070429 A1    Mar. 9, 2017

(30) Foreign Application Priority Data

Sep. 4, 2015    (KR) .................. 10-2015-0125234

(51) Int. Cl.
*H04L 12/741* (2013.01)
*H04L 29/08* (2006.01)
*H04L 12/413* (2006.01)

(52) U.S. Cl.
CPC ............ *H04L 45/74* (2013.01); *H04L 12/413* (2013.01); *H04L 69/321* (2013.01)

(58) Field of Classification Search
CPC ...... H04L 45/74; H04L 12/413; H04L 69/321
See application file for complete search history.

(56) References Cited

U.S. PATENT DOCUMENTS

| 7,337,241 | B2 | 2/2008 | Boucher et al. |
| 9,338,815 | B2* | 5/2016 | Yi .................. H04W 56/00 |
| 2007/0248118 | A1* | 10/2007 | Bishara ............ H04L 12/4013 |
| | | | 370/469 |
| 2008/0304481 | A1 | 12/2008 | Gurney et al. |

(Continued)

FOREIGN PATENT DOCUMENTS

| JP | H10210103 A | 8/1998 |
| JP | 2001057568 A | 2/2001 |

(Continued)

OTHER PUBLICATIONS

Japanese office action dated Sep. 19, 2017 for corresponding JP application.

(Continued)

*Primary Examiner* — Luat Phung
(74) *Attorney, Agent, or Firm* — K&L Gates LLP

(57) ABSTRACT

Disclosed embodiments relate to a communications interface apparatus that may include: a physical layer interface configured to receive first data from an external device and output the received first data; a relay configured to create first transmit data based on processing condition information of received data; and a medium control access (MAC) layer interface configured to receive the receive data output via the physical layer interface, transmit the received data to an upper layer, and receive second data in response to the transmitted data. The relay may store the processing condition information corresponding to the data received from the (Continued)

external device, and create the first transmit data based on the processing condition information corresponding to the received data when the received data is output via the physical layer interface.

5 Claims, 8 Drawing Sheets

(56) References Cited

U.S. PATENT DOCUMENTS

| | | | | |
|---|---|---|---|---|
| 2009/0232151 A1* | 9/2009 | Furlong | .............. | H04L 12/6418 370/419 |
| 2010/0106882 A1* | 4/2010 | Daniel | ................ | G06F 13/4059 710/314 |
| 2013/0265979 A1* | 10/2013 | Yamaguchi | ....... | H04W 28/0278 370/329 |

FOREIGN PATENT DOCUMENTS

| | | |
|---|---|---|
| JP | 2007518359 A | 7/2007 |
| KR | 100888596 B1 | 3/2009 |
| KR | 20090058744 A | 6/2009 |
| KR | 20130021352 A | 3/2013 |
| KR | 20130087343 A | 8/2013 |
| WO | 2006093021 A1 | 9/2006 |

OTHER PUBLICATIONS

European Search Report dated Jan. 13, 2017 in corresponding European Application No. 16184700.9.
Japanese Office Action for related Japanese Application No. 2016-168785; action dated May 8, 2018; (3 pages).

* cited by examiner

- Prior Art -

- Prior Art -

COMMUNICATION INTERFACE APPARATUS

CROSS REFERENCE TO RELATED APPLICATIONS

This application claims the benefit of Korean Patent Application No. 10-2015-0125234, filed on Sep. 4, 2015, entitled "COMMUNICATION INTERFACE APPARATUS", which is hereby incorporated by reference in its entirety.

BACKGROUND

Technical Field

The present disclosure relates to a communications interface apparatus and more specifically, to a communications interface apparatus for Ethernet communications.

Description of the Related Art

In Ethernet architecture, each of devices connected to a network uses Ethernet data that has the structure including a 48-bit MAC (media access control) address, its address, and a CRC code for detecting data and err. The device communicates data among them by using such addresses.

A BNC cable, a UTP cable and a STP cable are used as transmission media, and devices such as a hub, switched and repeaters are used to connect the devices.

The Ethernet uses the CSMA/CD (Carrier Sense Multiple Access with Collision Detection) technology. This technology allows a number of devices connected to Ethernet to share a single transmission medium.

FIG. 1 shows an existing communications interface apparatus.

Referring to FIG. 1, the communications interface apparatus includes a port 10, a physical layer interface 20, a media access control (MAC) layer interface 30, and a FIFO (First-In First-Out) 40.

The port 10 may be an Ethernet port and may receive a signal from an external device via a cable.

The physical layer interface 20 may process data transmitted from the port 10 via the cable to output it.

The MAC layer interface 30 may receive the data from the physical layer interface 20 to recognize fields in the data and may process and store the data conforming to the Ethernet protocol.

The FIFO 40 transmits the data stored in the MAC interface 30 to an upper layer via a bus.

FIG. 2 shows the data field format of Ethernet data.

The Ethernet data includes a preamble, a DA (Destination Address) field, a SA (Source Address) field, a type/length field, a data/payload field, a FCS (Frame Check Sequence, CRC) field.

An upper layer checks data stored in the MAC layer interface 30, processes transmit data to be transmitted to an external device and transmits it to the MAC interface 30.

Specifically, if a host attempts to transmit data, the host (transmit host) detects a signal in the network, determines whether data can be transmitted, and begins transmission if possible.

If there is collision between data, the transmit host broadcasts a jam signal. A host corresponding to the destination of the data (receive host) checks the value of the data transmitted from the transmit host and determines whether the data is defective.

The receive host transmits the received data to an upper layer if there is no defect in the CRC value of the data, and discards the received data if there is a defect in the CRC value of the data.

If there is collision between data, the transmit host retransmits the data after a random time period. The retransmission is performed after a random time period instead of a fixed time period, because collision may occur again after a fixed time period and thus the collision can be detected.

According to such Ethernet communications method, however, transmit data is created after the data received in the upper layer has been processed. Then, the transmit data is transmitted from the receive host to the transmit host. Accordingly, there is a problem in that it takes long time for the transmit data to be transmitted from the receive host to the transmit host.

SUMMARY

It is an aspect of some embodiments of the present disclosure to provide a communications interface apparatus capable of receiving receive data at the time of Ethernet communications and selecting time interval at which transmit data is sent accordingly, thereby allowing for faster communications.

It is another aspect of some embodiments of the present disclosure to provide a communications interface apparatus capable of performing processing on received data in advance based on a predetermined variable of the received data to create transmit data, and transmitting the created transmit data based on a preset time variable to an external device.

Objects of some embodiments of the present disclosure are not limited to the above-mentioned object. Other objects that are not mentioned may be apparent to those skilled in the art to which the present disclosure pertains from the following description.

In accordance with one aspect of some embodiments of the present disclosure, a communications interface apparatus includes: a physical layer interface configured to receive first data from an external device and output the received first data; a medium control access (MAC) layer interface configured to receive the first data output via the physical layer interface, transmit the received first data to an upper layer, and receive second data in response to the transmitted first data; and a relay configured to receive the first data output via the physical layer interface and create third data based on processing condition information of the first data to output it, wherein the relay stores the processing condition information corresponding to the first data received from the external device, and creates third data based on the processing condition information corresponding to the received first data upon receiving the first data via the physical layer interface.

The MAC layer interface includes: a receive buffer storing the received first data; a transmit buffer storing the second data transmitted from the upper layer; and a transmission status management unit controlling transmission of the third data and the second data to the physical layer interface.

The transmission status management unit may provide the relay with transmission status information indicating whether there is data transmitted from the MAC layer interface to the physical layer interface based on whether there is the second data.

The processing condition information may be set based on at least one of a destination address, a source address, a type, a length and a transmission time variable of the received first data.

The relay may analyze a variable on the first data output from the physical layer interface to determine whether there is transmit data in response to the received first data.

The relay may be configured to: create third data corresponding to the first data if it is determined that there is transmit data in response to the received first data, and transmit the created third data to the physical layer interface at a time point corresponding to the transmission time variable.

The relay may transmit the third data at a time point where the second data is not transmitted from the MAC layer interface to the physical layer interface based on the transmission status information provided from the MAC layer interface.

The transmission status management unit may be configured to: receive the third data from the relay, check if the second data is being transmitted at the time of transmitting the third data upon receiving the third data, and transmitting the third data to the physical layer interface at the time point where the second is not transmitted.

DETAILED DESCRIPTION

Figure 1:
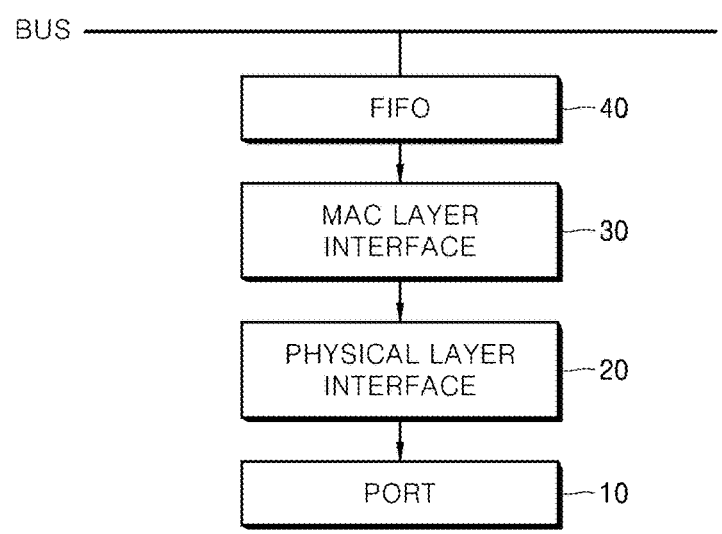
FIG. 1 shows an existing communications interface apparatus, according to the prior art.
Figure 2:
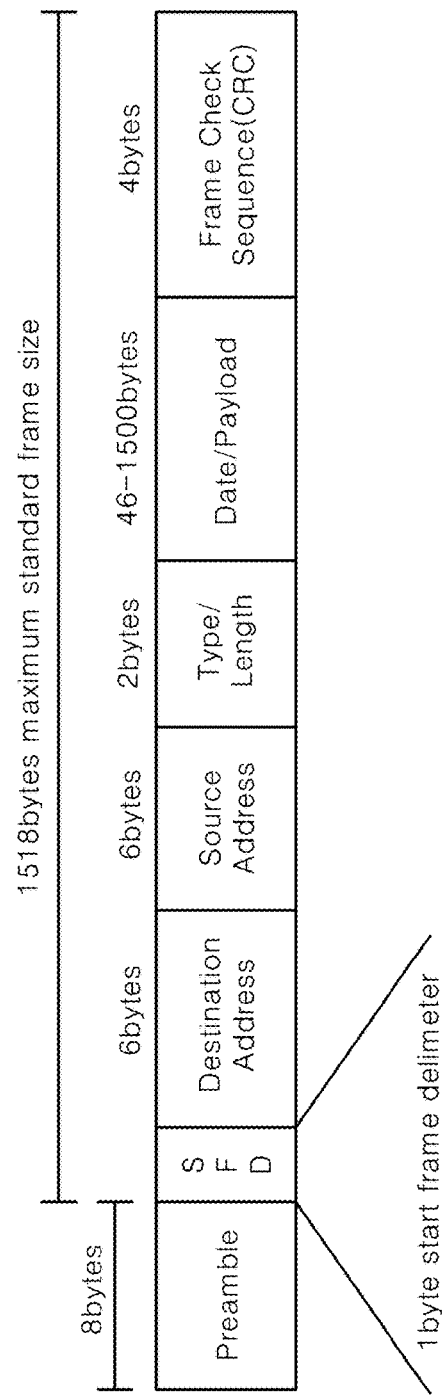
FIG. 2 shows the data field format of Ethernet data, according to the prior art.

Advantages and features of the present disclosure and methods to achieve them will become apparent from the descriptions of embodiments herein below with reference to the accompanying drawings. However, the present disclosure is not limited to embodiments disclosed herein but may be implemented in various different ways. The embodiments are provided for making the disclosure of the present disclosure thorough and for fully conveying the scope of the present disclosure to those skilled in the art. It is to be noted that the scope of the present disclosure is defined solely by the claims. Like reference numerals denote like elements throughout the descriptions.

Detailed descriptions of well-known functions and structures incorporated herein will be omitted to avoid obscuring the subject matter of the present disclosure. Further, terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way. Therefore, the terms, such as those defined in commonly used dictionaries, should be interpreted as including a meaning that is consistent with their meaning in the context of the relevant art and/or the present application.

Combinations of blocks in the accompanying drawings and steps in flow charts may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow charts. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products comprising instruction means for performing the functions described in the blocks in the drawings or in the steps in the flow charts. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow charts.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

Figure 3:
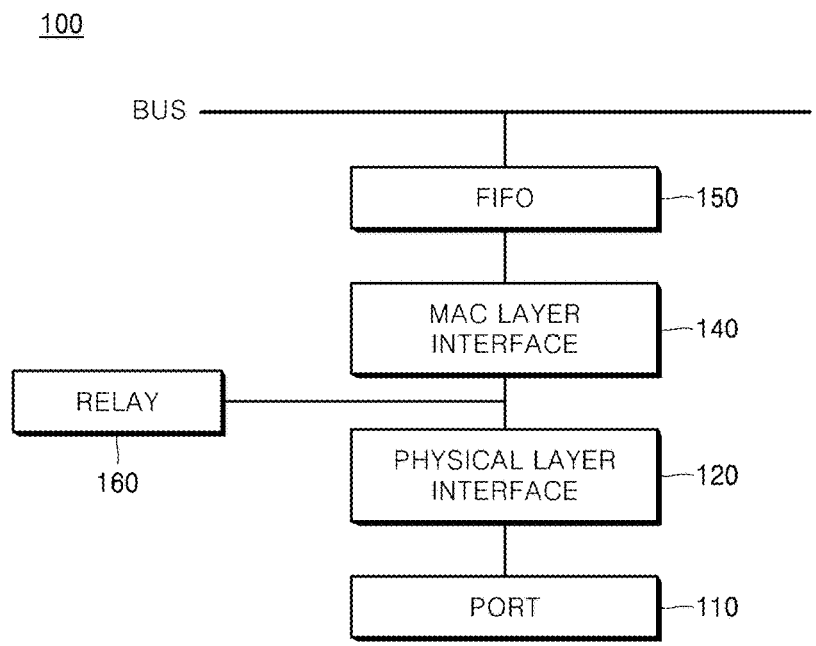
FIG. 3 is a block diagram of a communications interface device according to an embodiment of the present disclosure.

FIG. 3 is a block diagram of a communications interface apparatus according to an embodiment of the present disclosure.

Referring to FIG. 3, a communications interface apparatus 100 includes a port 110, a physical layer interface 120, a media access control (MAC) layer interface 140, a FIFO 150 and a relay 160.

As is known in the art, a topology of a communications interface apparatus such as the communications interface apparatus 100 refers to a layout of nodes of a communications network architecture, showing how the nodes are connected to one another.

The topology includes a variety of shapes such as bus, star, mesh, ring, etc. Bus topology is a network architecture in which several computers are connected to a single communications line. The bus topology includes the advantage in that it is easy to add, change or remove a computer to a communications line but also includes the disadvantage in that the entire network may be affected once a part of the communications line includes fault. In addition, the communications line includes a tap, a drop line and a terminator.

Star topology is a network architecture in which computers are connected to a central network equipment called as a hub in point-to-point connection. In star topology, computers cannot communicate directly with one another but can communicate via a hub.

Mesh topology is a network architecture in which all network nodes are connected to one another such that communications lines are longest. Mesh topology is a typical communications network at the early stage and frequently used in public switched networks.

In ring topology, links are arranged in one direction, and thus data is transmitted only one direction. Each node possesses a token used for controlling transmission/reception of data. Such ring topology includes the advantage in that it is easy to reconfigure a network, such as adding/eliminating a computer to/from a communications line.

Referring back to FIG. 3, the port 110 receives first data transmitted from an external device via an Ethernet cable. In some embodiments of the present disclosure, more than one port may be disposed.

The physical layer interface 120 may process the first data received from the port 110 to output it. The physical layer interface 120 may receive signals conforming to different protocols and may transmit the data obtained by processing the received first data to an external device via the port 110.

The processed data includes second data obtained by processing the first data in an upper layer and third data processed in the relay 160 to be described later.

More specifically, the physical layer interface 120 may receive Ethernet data transmitted from an external network, recover a clock and data and then output it, or may perform the reverse operation.

The MAC layer interface 140 stores the first data output via the physical layer interface 120 to transmit it to an upper layer, and receives the second data obtained by processing the transmitted first data in the upper layer to transmit it to the physical layer interface 120.

An Ethernet media independent interface (MII, not shown) working as a communications interface may be further disposed between the physical layer interface 120 and the MAC layer interface 140.

Transmit data, a transmit clock, a transmit enable signal, receive data, receive clock, receive valid signal and a CRC (circuit reset) are matched to the physical layer interface 120 and the MAC layer interface 140.

The receive data and the transmit data is communicated between the MAC layer interface 140 and the physical layer interface 120 via 4-bit data buses and the buses are synchronized to clocks, respectively.

The transmit clock is used as a reference clock of the transmit bus, and the receive clock is used as a reference clock of the receive bus.

The transmit enable signal is used to notify a receiving data that it is ready to transmit data, and is connected to a receive valid at the receiving side.

The FIFO 150 is disposed between the MAC interface 140 and a bus connecting to the upper layer.

The FIFO 150 transmits the data transmitted from the MAC layer interface 140 to the upper layer and receives transmit data corresponding to the transmitted data from the upper layer to transmit it to the physical layer interface 120.

To this end, the FIFO 150 may be connected to a FIFO (not shown) in the upper layer (e.g., a master device).

In addition, a CA line, an Enb line, a DAT line, a SOC line and a CLK line are disposed between the FIFO 150 and the FIFO in the upper layer for data transfer.

The CA (cell available) line transmits or receives a CA signal notifying that a cell may be received. Accordingly, a signal indicating whether there is a cell to be transmitted or a signal indicating that a cell may be received is transmitted or received via the CA line.

The Enb line transmits or receives a signal indicating that the cell can be transmitted or received. Based on this, a signal indicating that a cell can be transmitted or a signal indicating that there is space for storing a cell is transmitted.

The DAT line transmits data to the upper layer or receives data transmitted from the upper layer.

The SOC (start of cell) line transmits or receives a signal indicating that a cell transmission is started.

The CLK (clock) line transmits or receives a clock signal for system synchronization.

The relay 160 is disposed between the physical layer interface 120 and the MAC layer interface 140.

The relay 160 receives the first data output via the physical layer interface 120 and stores it. In addition, third data corresponding to the store first data is created and the third data is transmitted to the MAC layer interface 140.

Preferably, when the third data is created, the relay 160 transmits the third data to a signal transmission line between the MAC layer interface 140 and the physical layer interface 120. In this manner, the third data corresponding to the first data may be transmitted to an external device via the physical layer interface 120.

That is, the first data is received via the physical layer interface 120, the relay 160 checks the fields of the received first data to determine whether the first data has to be transmitted (or requires a response).

In other words, the first data transmitted from an external device may merely provide information. In that case, the second data processed in the upper layer corresponding to the received first data may not be transmitted.

Alternatively, the first data transmitted from the example device may be the same transmit data as a response data, e.g., data that requires the second data. In this case, the received first data is analyzed to create the second data, and the created second data has to be transmitted to the example device.

Accordingly, the relay 160 includes predetermined condition variables. The condition variables include a destination address, a source address, type/length and transmission time.

In addition, when the first data is received, the relay 160 analyzes the received first data to determine fields such as a preamble, a destination address, a source address and type and filtering conditions set by a user.

In addition, the relay 160 creates predefined third data corresponding to the first data. Then, the third data is transmitted to the physical layer interface 120 via the MAC layer interface 140.

In other words, in the relay 160 third data is defined which responses to the first data according to preset logic if it is determined that there is transmit data in response to the received first data.

That is, the information stored in the relay 160 may indicate that the relay 160 performs no operation if the first data meets a first condition, the relay 160 transmits third data comprising first content if the first data meets a second condition, and the relay 160 transmits third data comprising second content if the first data meets a third condition.

In addition, the relay 160 analyzes the first data in hardware to obtain preset information on the type of the first data and process to be performed. In addition, based on the preset information, the relay 160 performs processing on the first data and creates third data.

Then, the third data may be transmitted directly to the physical layer interface 120 via the relay 160. Alternatively, the third data may be transmitted to the physical layer interface 120 via the MAC layer interface 140.

This will be described in more detail below.

Figure 4:
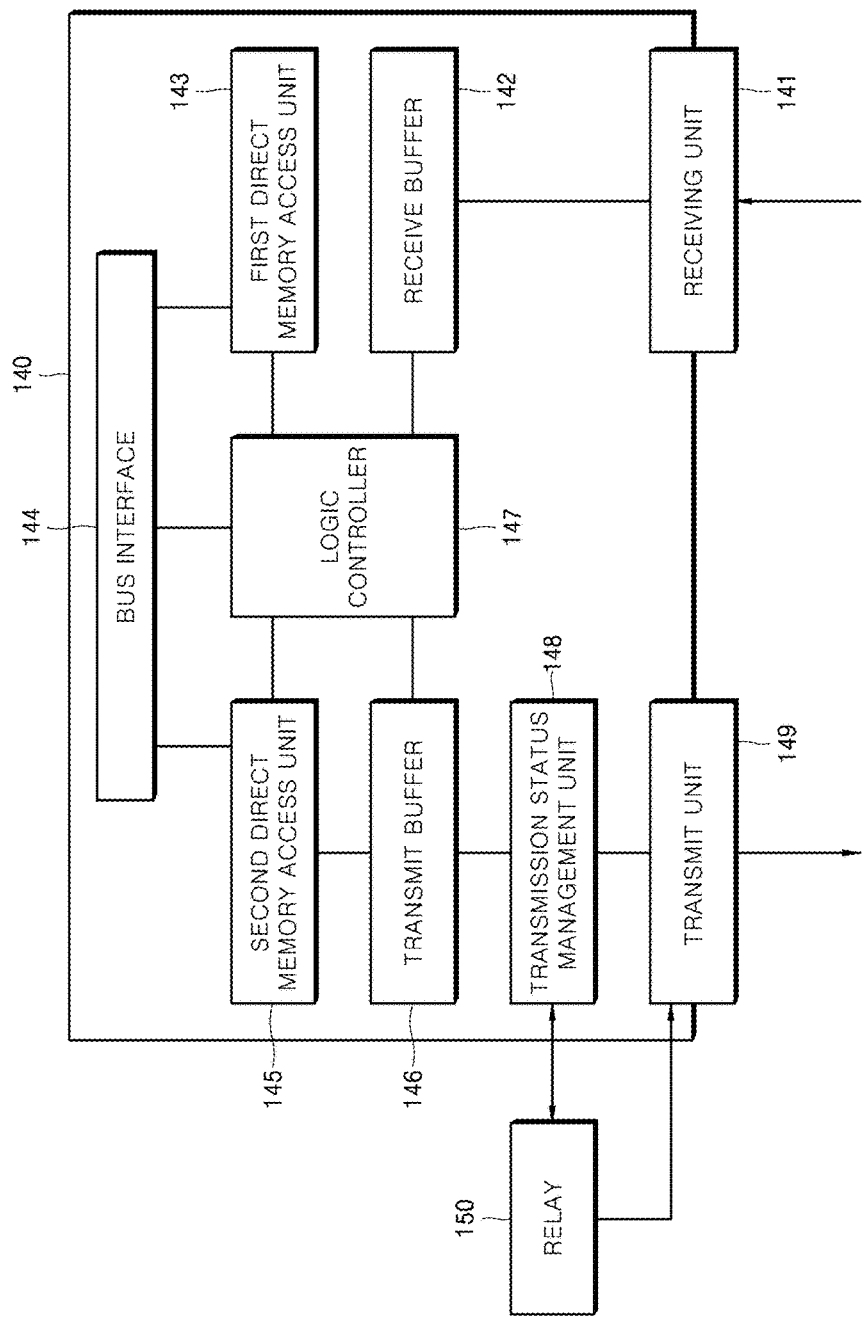
FIG. 4 is a block diagram of the MAC layer interface 140 shown in FIG. 3 according to an embodiment of the present disclosure.

FIG. 4 is a block diagram of the MAC layer interface 140 shown in FIG. 3.

The MAC layer interface 140 includes a receiving unit 141, receive buffer 142, a first direct memory access unit 143, a bus interface 144, a second direct memory access 145, a transmit buffer 146, a logic controller 147, a transmission status management unit 148 and a transmitting unit 149.

The operation of the MAC layer interface 140 is as follows:

The receive unit 141 receives the first data output via the physical layer interface 120 and stores it in the receive buffer 142.

The first data stored in the receive buffer 142 is selectively loaded by the first direct memory access unit 143 and is transmitted to an upper layer via the bus interface 144.

Then, the upper layer accesses the receive buffer 142 via the first direct memory access unit 143 to load desired data and performs process of the loaded data to create second data.

The second data created from the upper layer is transmitted to the second direct memory access unit 145 via the bus interface 144. Then, the second direct memory access unit 145 stores the second data transmitted from the upper layer in the transmit buffer 146.

The logic controller 147 arbitrates the first data stored in the receive buffer 142 and the second data stored in the transmit buffer 146.

The MAC layer interface 140 transmits/receives the first data and the second data to/from a bus of a terminal where it is installed (a bus connected to an upper layer).

Then, the second data stored in the transmit buffer 146 is transmitted to the physical layer interface 120 via the receiving unit 149

The transmission status management unit 148 is disposed between the transmitting unit 149 and the transmit buffer 146.

The transmission status management unit 148 arbitrates transmission of the second data between the transmitting unit 149 and the transmit buffer 146.

In addition, if there is third data transmitted from the relay 160, e.g., if the third data created based on the preset information is received other than the second data processed by the upper layer, the transmission status management unit 148 transmits the third data transmitted from the received relay 160 to the physical layer interface 120 via the transmitting unit 149.

When the third data is received, the transmission status management unit 148 checks if there is the second data. In other words, when the third data is received, the transmission status management unit 148 checks if the second data created by the upper layer is being transmitted to the physical layer interface 120.

That is, the transmission status management unit 148 determines whether the second data is being transmitted at the time of receiving the third data via the 149.

If it is determined that the second data is being transmitted at the time receiving the third data, the transmission status management unit 148 delays the transmission of the third data and allows for the transmission of the second data first. By doing so, it is possible to prevent collision between the second data and the third data occurring when they are transmitted at the same time.

In addition, if it is determined that the second data is not being transmitted at the time of receiving the third data, the transmission status management unit 148 transmits the third data to the physical layer interface 120 via the transmitting unit 149.

The transmission status management unit 148 may not directly transmit the third data but may only provide information on the transmission of the third data, such that the third data may be directly input to the transmitting unit 149 via the relay 160.

To this end, the transmission status management unit 148 transmits to the relay 160 the information on whether the second data created by the upper layer is being transmitted, e.g., transmission status information indicating whether the transmitting unit 149 is being taken or not.

In addition, the relay 160 transmits the third data to the transmitting unit 149 while the transmitting unit 149 is not being used, such that the third data may be transmitted to the physical layer interface 120.

Figure 5:
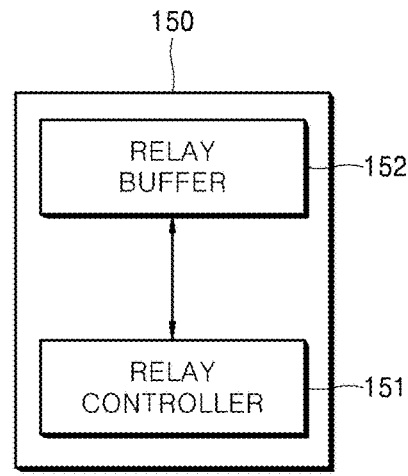
FIG. 5 is a block diagram of the relay 160 shown in FIG. 3 according to an embodiment of the present disclosure.

FIG. 5 is a block diagram of the relay 160 shown in FIG. 3.

Referring to FIG. 5, the relay 160 includes a relay buffer 151 and a relay controller 152.

The relay buffer 151 receives the data via the physical layer interface 120 and stores it.

The relay buffer 151 stores processing condition information indicating processing condition depending on the type of the received first data. The processing condition information describes processing condition of the received data based on a destination address, a source address, and type/length.

In other words, if certain data is received, the processing condition information describes how the received first data is processed and accordingly how the third data is created.

In addition, the processing condition information includes transmission time variable. Accordingly, the third data is created based on the transmission time variable, the relay 160 allows the third data to be transmitted to the physical layer interface 120 when it is time corresponding to the transmission time variable.

That is, the transmission time variable may be set by a user. Alternatively, the transmission time variable may include conditions such as the third data is transmitted after the received first data has been analyzed and processed.

The relay controller 152 determines whether the third data corresponding to the first data is created based on the processing condition information stored in the relay buffer 151 and the received first data, and creates third data corresponding to the first data if the third data is created.

When the third data is created, the relay controller 152 transmits the third data to the transmission status management unit 148 such that the third data is transmitted to the physical layer interface 120.

The relay controller 152 controls when to transmit the third data to the physical layer interface 120 based on the set transmission time variable.

In addition, the relay controller 152 may not transmit the third data to the transmission status management unit 148 but may receive transmission status information on the MAC layer interface from the transmission status management unit 148. In this case, the relay controller 152 may directly transmit the third data to the physical layer interface 120 at the time where the transmission status information indicates that the transmitting unit is not used based on the transmission time variable.

According to an embodiment of the present disclosure, receive data is converted to a digital signal in the physical layer interface 120 to be output, and third data for the received first data is created based on processing condition information stored in the relay in advance, such that the created third data is transmitted to the physical layer interface 120 based on a predetermined transmission time variable, achieving high speed data transmission.

Figure 6:
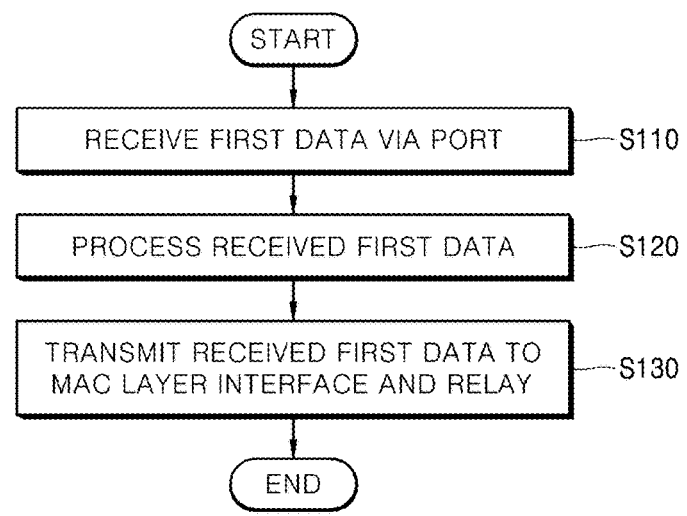
FIG. 6 is a flowchart for illustrating a method for operating the physical layer interface 120 according to an embodiment of the present disclosure.

FIG. 6 is a flowchart for illustrating a method for operating the physical layer interface 120 according to an embodiment of the present disclosure.

Referring to FIG. 6, the physical layer interface 120 may receive first data transmitted from an external device via the port 110 (step S110), and may perform processing on the received first data, e.g., converting it to a digital signal.

Then, the physical layer interface 120 may transmit the processed first data to an external device (step S130).

In doing so, the physical layer interface 120 may transmit the received first data to the MAC layer interface 140.

In addition, the physical layer interface 120 also transmits the same data as the first data transmitted to the MAC layer interface 140 to the relay 160 disposed between the physical layer interface 120 and the MAC layer interface 140.

Accordingly, the physical layer interface 120 allows the received first data to be processed in both of an upper layer and the relay 160 via the MAC layer interface 140.

Figure 7:
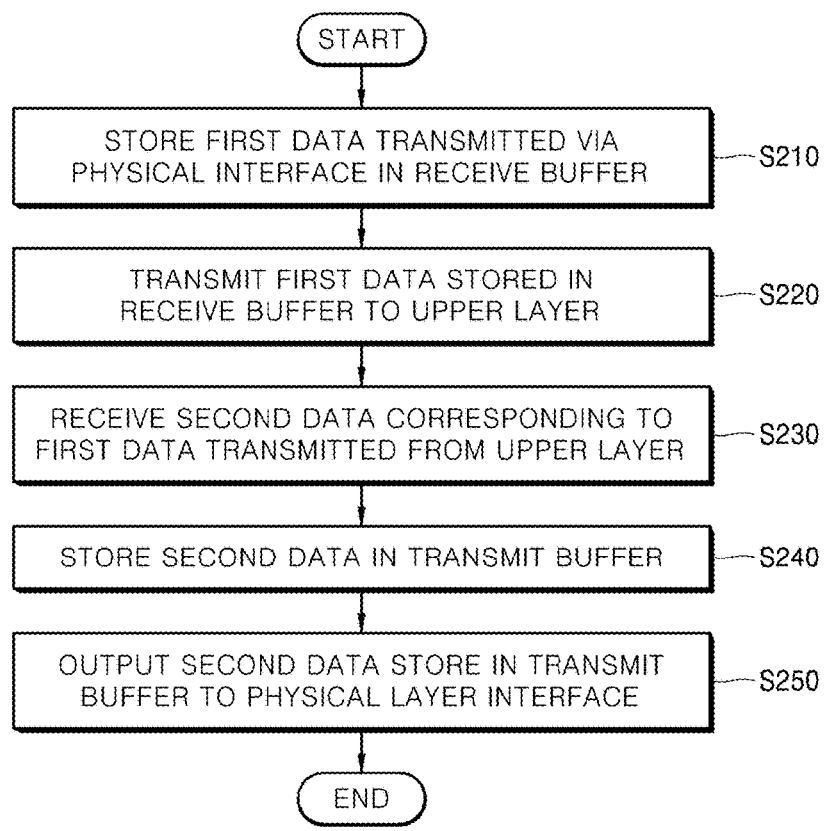
FIGS. 7 and 8 are flowcharts for illustrating steps of a method for operating the MAC layer interface 140 according to an embodiment of the present disclosure.
Figure 8:
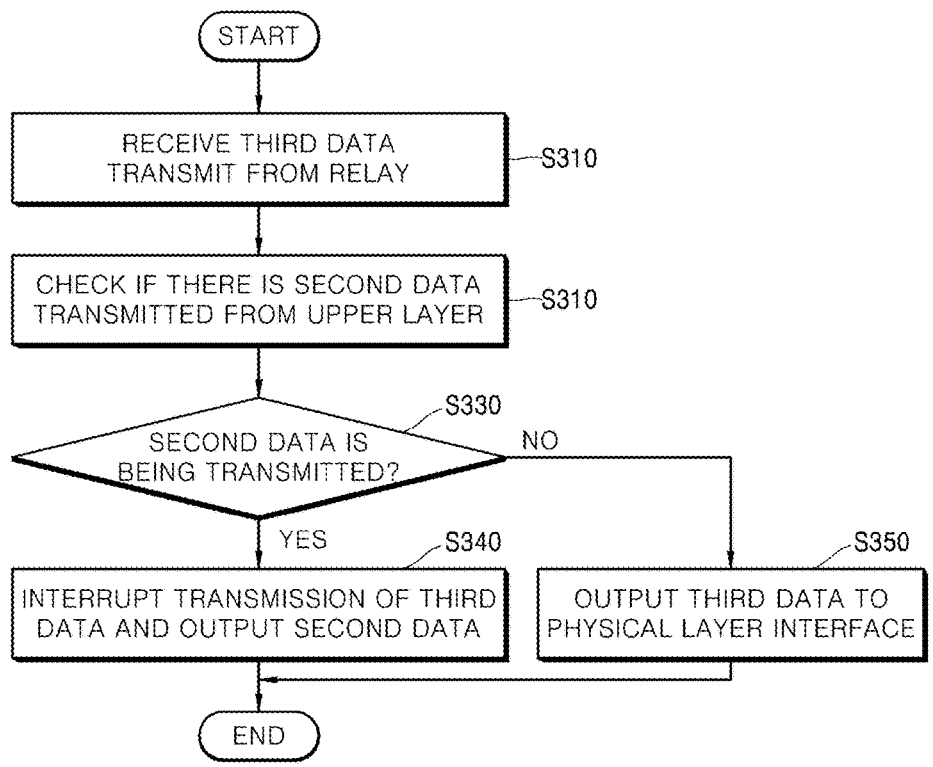

FIGS. 7 and 8 are flowcharts for illustrating steps of a method for operating the MAC layer interface 140 according to an embodiment of the present disclosure.

Referring to FIG. 7, the first data transmitted via the physical layer interface 120 is stored in the receive buffer 142 (step S210).

Subsequently, the first data stored in the receive buffer 142 is transmitted to an upper layer via the first direct memory access unit 143 and the bus interface 144 (step S220).

Subsequently, the transmitted first data is processed in the upper layer, and second data is created as a result and is transmitted (step S230).

Subsequently, the second data transmitted from the upper layer is stored in the transmit buffer 240 (step S240).

Subsequently, the second data stored in the transmit buffer 240 is transmitted to the physical layer interface 120 via the transmitting unit 149 under the control of the transmission status management unit 148 (step S250).

Referring to FIG. 8, the transmission status management unit 148 receives third data transmitted from the relay 160 (step S310).

Upon receiving the third data, the transmission status management unit 148 checks whether there is second data transmitted from the upper layer at the time of receiving the third data (step S320). In other words, the transmission status management unit 148 determines whether the second data is being transmitted at the time of receiving the third data via the MAC layer interface 140.

Subsequently, the transmission status management unit 148 determines whether the second data is being transmitted based on the result obtained by the checking (step S330).

If it is determined that the second data is being transmitted, the transmission status management unit 148 interrupts outputting the third data and allows the second data to keep being output to the physical layer interface 120 (step S340).

In addition, if it is determined that the second data is not being transmitted, the transmission status management unit 148 transmits the received third data to the physical layer interface 120 (step S350).

Figure 9:
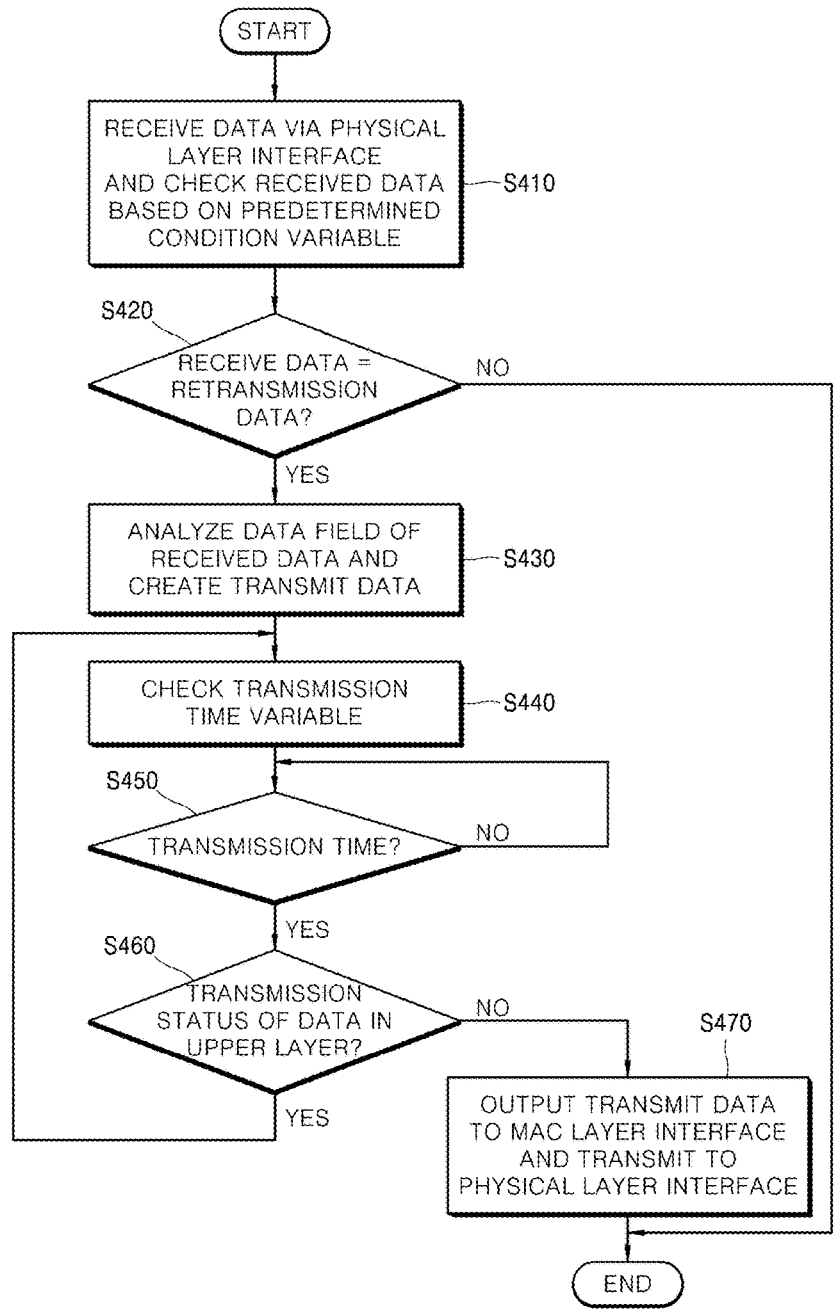
FIG. 9 is a flowchart for illustrating steps of a method for operating the relay 160 according to an embodiment of the present disclosure.

FIG. 9 is a flowchart for illustrating steps of a method for operating the relay 160 according to an embodiment of the present disclosure.

Referring to FIG. 9, the relay 160 receives first data transmitted via the physical layer interface 120 and analyzes the received first data based on the processing condition information depending on predetermined variables (step S410).

Subsequently, the relay 160 determines whether transmit data corresponding to the received first data is created (step S420).

Subsequently, if the transmit data is created, the relay 160 may analyze the data field of the received first data and may create third data corresponding to the received first data based on the processing condition information (step S430).

Subsequently, the relay 160 checks transmission time variable of the third data (step S440).

Subsequently, the relay 160 determines whether it is the time point to transmit the third data based on the transmission time variable (step S450).

If it is determined that it is the time point to transmit the third data, the relay 160 determines whether the second data created from an upper layer is being transmitted via the MAC layer interface 140 (step S460).

Subsequently, if it is determined that the second data is not being transmitted via the MAC layer interface 140, the relay 160 outputs the second data to the MAC layer interface 140 and accordingly transmits the third data to the physical layer interface 120.

According to an embodiment of the present disclosure, receive data is converted to a digital signal in the physical layer interface 120 to be output, and transmit data for the received data is created based on processing condition information stored in the relay in advance, such that the created transmit data is transmitted to the physical layer interface 120 based on a predetermined transmission time variable, achieving high speed data transmission.

According to another embodiment of the present disclosure, a communications interface apparatus includes a relay disposed between the physical layer interface and the MAC layer interface. The relay receives first data in the physical layer interface and creates third data based on preset setting information of the first data. In addition, the relay transmits the third data to a signal transmission line between the MAC layer interface and the physical layer interface based on the fields of the first data. Further, when third data is received, the MAC layer interface transmits the second data created in an upper layer first and then transmits the third data. By doing so, it is possible to prevent collision between the second data and the third data.

References to "one embodiment" or "an embodiment" do not necessarily refer to the same embodiment, although they may. Further, a particular feature, structure, effect in an embodiment may be practiced in other embodiments by combining or modifying them by those skilled in the art. Accordingly, it is to be understood that such combinations and modifications also fall within the scope of the present disclosure.

According to an embodiment of the present disclosure, received data is converted to a digital signal in the physical layer interface 120 and transmit data is created for the received data based on processing condition information stored in the relay in advance. In addition, the created transmit data is transmitted to the physical layer interface 120 based on a preset time variable. As a result, high speed data transmission can be achieved.

Although the embodiments of the present disclosure have been disclosed for illustrative purposes, those skilled in the art would appreciate that various modifications and substitutions may be made without departing from the scope and spirit of the disclosure. For example, elements of the embodiment of the present disclosure may be modified. Such modifications and substitutions are also construed as falling within the scope of the present disclosure as defined by the appended claims. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A communications interface apparatus comprising:
   a physical layer interface configured to receive first data from an external device and output the received first data;
   a medium control access (MAC) layer interface configured to receive the first data output via the physical layer interface, transmit the received first data to an upper layer, and receive second data in response to the transmitted first data; and
   a relay, separate from the physical layer interface and the MAC layer interface, configured to receive the first data output via the physical layer interface, create third data based at least on processing condition information of the first data, and output the third data,
   wherein the relay is further configured to store the processing condition information corresponding to the first data received from the external device, and create the third data based at least on the processing condition information corresponding to the received first data upon receiving the first data via the physical layer interface, and
   wherein the MAC layer interface comprises:
      a receive buffer configured to store the received first data;
      a transmit buffer configured to store the second data transmitted from the upper layer; and
      a transmission status management unit configured to control transmission of the third data and the second data to the physical layer interface,
   wherein the processing condition information is based on at least one of: a destination address, a source address, a type, a length, or a transmission time variable of the received first data, and
   wherein the transmission status management unit is further configured to receive the third data from the relay, check if the second data is being transmitted at the time of transmitting the third data upon receiving the third data, and transmit the third data to the physical layer interface at the time point where the second data is not transmitted.

2. The apparatus of claim 1, wherein the transmission status management unit is further configured to provide the relay with transmission status information indicating whether data is transmitted from the MAC layer interface to the physical layer interface based at least on whether there is the second data.

3. The apparatus of claim 1, wherein the relay is further configured to analyze a variable on the first data output from the physical layer interface to determine whether there is transmit data in response to the first data.

4. The apparatus of claim 3, wherein the relay is further configured to:
   create the third data corresponding to the first data if it is determined that there is transmit data in response to the first data, and
   transmit the created third data to the physical layer interface at a time corresponding to the transmission time variable.

5. The apparatus of claim 4, wherein the relay is further configured to transmit the third data when the second data is not transmitted from the MAC layer interface to the physical layer interface based at least on the transmission status information provided from the MAC layer interface.

* * * * *